(12) United States Patent
Campos et al.

(10) Patent No.: US 9,204,380 B2
(45) Date of Patent: Dec. 1, 2015

(54) OPTIMIZING NETWORK ACCESS

(71) Applicant: Cable Television Laboratories, Inc., Louisville, CO (US)

(72) Inventors: Luis Campos, Superior, CO (US); Jennifer Andreoli-Fang, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 16 days.

(21) Appl. No.: 13/855,768

(22) Filed: Apr. 3, 2013

(65) Prior Publication Data

US 2014/0141770 A1 May 22, 2014

Related U.S. Application Data

(63) Continuation of application No. 13/173,314, filed on Jun. 30, 2011, now Pat. No. 8,417,260.

(51) Int. Cl.
*H04W 4/00* (2009.01)
*H04W 48/18* (2009.01)
*H04W 4/20* (2009.01)
*H04W 64/00* (2009.01)
*H04W 4/02* (2009.01)

(52) U.S. Cl.
CPC ............ *H04W 48/18* (2013.01); *H04W 4/20* (2013.01); *H04W 4/02* (2013.01); *H04W 4/023* (2013.01); *H04W 64/006* (2013.01)

(58) Field of Classification Search
CPC ... H04W 36/32; H04W 4/00; H04W 36/0083; H04W 48/16; H04W 64/00; H04W 24/00; H04L 1/0006; H04L 27/2613; H04L 5/0048; H04L 5/005; H04L 5/0085
USPC .......... 455/456, 418, 575.1, 157, 574, 426.1, 455/435.2, 573, 439, 517, 441, 445, 561, 455/442, 411, 417, 444, 11.1
See application file for complete search history.

(56) References Cited

U.S. PATENT DOCUMENTS

| | | | | |
|---|---|---|---|---|
| 5,457,810 | A * | 10/1995 | Ivanov et al. | 455/441 |
| 6,826,161 | B1 * | 11/2004 | Shahidi et al. | 370/331 |
| 6,934,546 | B1 * | 8/2005 | Corbett et al. | 455/441 |
| 8,457,038 | B1 * | 6/2013 | Xue et al. | 370/318 |
| 2006/0221900 | A1 * | 10/2006 | Zhang et al. | 370/331 |
| 2009/0061881 | A1 * | 3/2009 | Gonsa et al. | 455/442 |
| 2009/0086672 | A1 * | 4/2009 | Gholmieh et al. | 370/329 |
| 2009/0154426 | A1 * | 6/2009 | Perraud et al. | 370/332 |
| 2009/0180429 | A1 * | 7/2009 | Stevens et al. | 370/329 |
| 2009/0278705 | A1 * | 11/2009 | Chhabra et al. | 340/825.49 |
| 2010/0022216 | A1 * | 1/2010 | Bandera et al. | 455/405 |
| 2010/0261496 | A1 * | 10/2010 | Fukumoto et al. | 455/517 |
| 2010/0311430 | A1 * | 12/2010 | Katayama et al. | 455/450 |
| 2010/0324977 | A1 * | 12/2010 | Dragt | 705/14.1 |
| 2011/0026506 | A1 * | 2/2011 | Macnaughtan et al. | 370/338 |
| 2011/0034179 | A1 * | 2/2011 | David et al. | 455/456.1 |
| 2011/0225417 | A1 * | 9/2011 | Maharajh et al. | 713/150 |
| 2012/0129544 | A1 * | 5/2012 | Hodis et al. | 455/456.1 |
| 2012/0258734 | A1 * | 10/2012 | Takahashi et al. | 455/456.1 |
| 2012/0276866 | A1 * | 11/2012 | Sennett et al. | 455/404.2 |

* cited by examiner

*Primary Examiner* — Joseph Arevalo
(74) *Attorney, Agent, or Firm* — Great Lakes Intellectual Property, PLLC.

(57) ABSTRACT

A network access optimization strategy where mobile device may be directed to access particular networks depending on operation requirements and characteristic. The optimization strategy may rely on a traveling speed of the mobile to device to broadly prioritize a network type suitable for the given traveling speed.

17 Claims, 8 Drawing Sheets

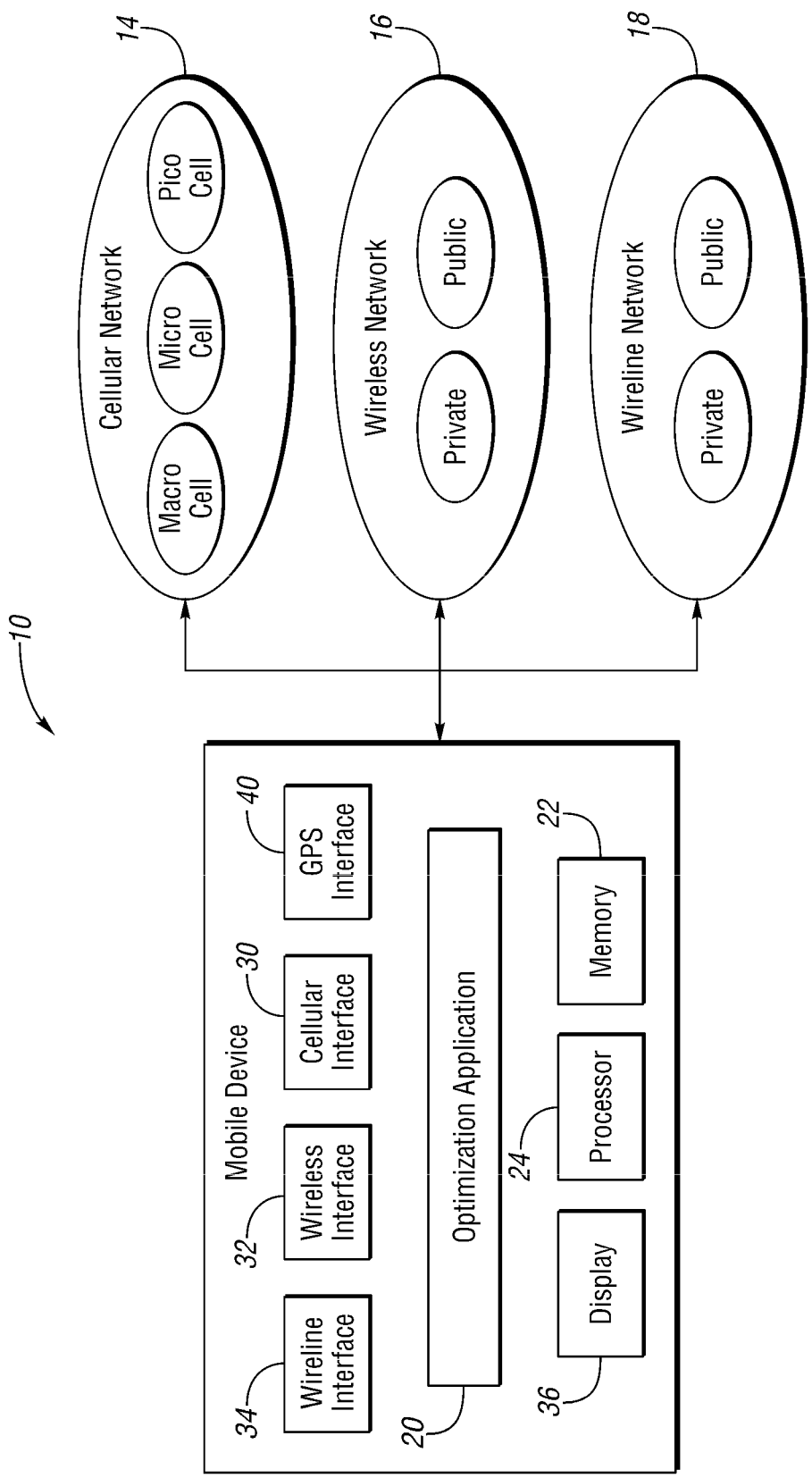

OPTIMIZING NETWORK ACCESS

CROSS-REFERENCE TO RELATED APPLICATIONS

This application is a continuation of U.S. application Ser. No. 13/173,314 filed Jun. 30, 2011, now U.S. Pat. No. 8,417,260, the disclosure of which is incorporated in its entirety by reference herein.

TECHNICAL FIELD

The present invention relates to a network selection methodology that optimizes network access cost and performance using subscriber end device position, speed, service type and/or other metrics

BACKGROUND

The cost to support message exchange, data download, media streaming, and other signaling can be calculated according to a dollar value per transported bit ($/bit) and/or a dollar value per transport speed ($/Mbps). While the computation of costs may vary depending on subscriber subscription agreements, infrastructure, maintenance, security, performance, bandwidth, and other characteristics of the network, a cellular network is typically more expensive than a wireless network and a wireless network is typically more expensive than a wireline network. With the advent of mobile devices having capabilities to support signaling over each of the cellular, wireless, and wireline networks, the inventors of the present invention have identified a need to optimize network access, such as to optimize access in a manner than is most cost-effective for the mobile device user.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a system for optimizing access of a mobile device to one or more networks in accordance with one non-limiting aspect of the present invention.

DETAILED DESCRIPTION

Figure 2A:
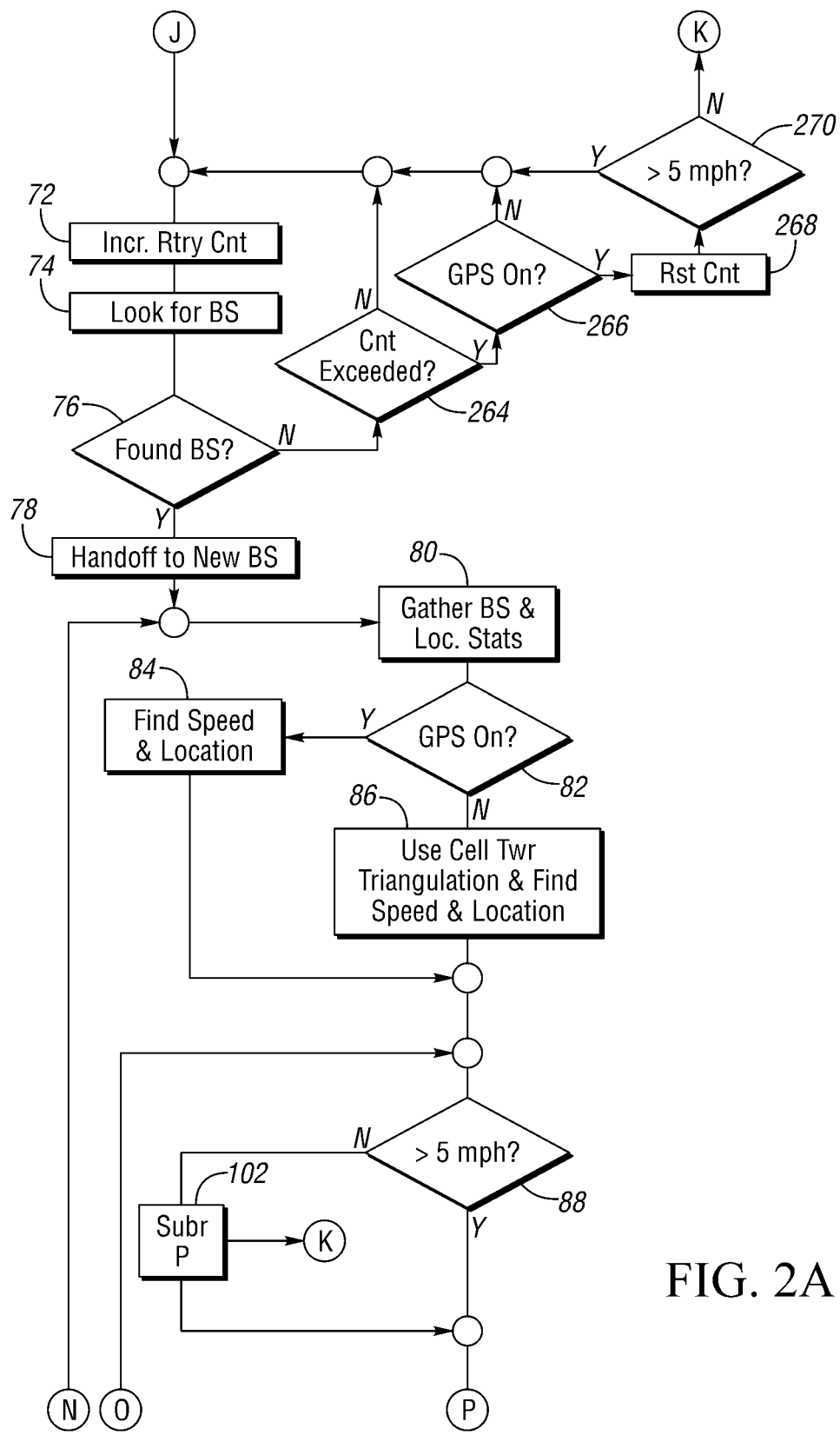
FIGS. 2a-2h illustrate portions of a flowchart for a method of optimizing access to networks in accordance with one non-limiting aspect of the present invention

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention FIG. 1 illustrates a system 10 for optimizing access of a mobile device 12 to one or more networks 14, 16, 18 in accordance with one non-limiting aspect of the present invention. The device 12 is shown to include an optimization application 20 operable to facilitate optimizing network access. The optimization application 20 may be represented according to a plurality of instructions stored on a computer-readable medium 22 which, when executed by a processor 24 operating on the mobile device 12, cause the processor 24 to optimize network access as contemplated by the present invention. The mobile device 12 is shown to include a cellular interface 30, a wireless interface 32 and a wireline interface 34 to respectively facilitate signaling over the cellular network 14, the wireless network 16, and the wireline network 18.

A display 36 may be included in the event the mobile device 12 is a mobile phone, computer, personal digital assistant (PDA), television or other device requiring the display 36 to facilitate interfacing with a user. The display 36, however, may be omitted in the event the mobile device 12 is a router, media terminal adapter (MTA), gateway, settop box (STB), or a tethering device configured to facilitate signaling with another device (not shown). The mobile device 12 may be operable to support virtually any type of electronic service, such as but not limited to media streaming, internet or data access, video on demand (VOD), VoIP telephony, etc. A global positioning system (GPS) interface 40 may be included to facilitate geographical dependent related services, such as but not limited to navigation.

While the present invention contemplates the mobile device 12 being configured to optimize access to any type of network 14, 16, 18, the present invention is predominately described with respect to optimizing access to the cellular network 14, the wireless network 16, and the wireline network 18. The illustration of the networks 14, 16, 18 is provided for exemplary purposes and is not intended to necessarily limited the networks with which the mobile device 12 may interact. Moreover, the present invention is not necessarily limited to the number of networks 14, 16, 18 shown or the relative positioning of the networks 14, 16, 18. Any multiple of the illustrated and described networks 14, 16, 18 may be made available to the mobile device 12 for access such that the present invention contemplates optimizing access to any type of network 14, 16, 18, and particularly, to multiple, overlapping networks 14, 16, 18 having common coverage areas where the need to arbitrate between multiple networks 14, 16, 18 may be the greatest.

The cellular network 14 may be of the type where wireless/radio signaling is supported with a plurality of geographic space (cell towers) base stations each have a coverage area (cell) across which mobile devices 12 are handed as they move from cell to cell. The cellular network 14 is shown to support different coverage areas depending on whether the associated infrastructure is configured as a macro cells (largest coverage area and strongest signal), micro cells (medium coverage area and medium signal strength), and pico cells (smallest coverage area and weakest signal). As one skilled in the art will appreciate, there are a various characteristics and operating capabilities specific to macro, micro, and pico/femto cells that dictate their corresponding use.

The wireless network 16 may be of the type where wireless signaling is supported with an access point (e.g., a wireless router or other similar device) for a specific geographical area. The range of the supported area may be vary depending of a station (not shown) supporting the signaling. While the wireless network 16 may include cell (radio) towers and antennas analogous those in the cellular network 14, the wireless network 16 may be differentiated from the cellular network 14 in that adjoining wireless networks 16 do not operate in cooperation with each other to facilitate seamless transitions of the mobile, at least to the extent adjoining cellular cells cooperate with each other to facilitate mobile devices handoffs. Adjoining wireless networks 16, for example, may be independent of each other such that the mobile device 12 may need to re-authenticate with the handed-to network prior to be granted access whereas the same process would not be required with a cellular handoff due to the cellular networks 14 being essentially the same network, i.e., re-authentication would not be required. Cellular networks may also initiate handover from a centralized controlling entity when moving between cell towers whereas the wireless networks may initiated handover from the mobile device.

The wireless network 16 is shown to include private and public types of networks. The private and public networks generally correspond with a level of trust established between the network 16 and the mobile device 12. The public wireless network may be a hot-spot or other publically accessible wireless network where mobile devices are able to begin signaling over the network without having to encrypt their transmissions or otherwise achieve a certain level of trust. The private wireless network may correspond with a personal wireless network in the control of the user of the mobile device, a network that is relative free from public access, a network that benefits from encrypted communications, or a network that otherwise requires the accessing device to establish a certain level of trust prior to being granted access to the network (i.e., before the mobile device is able to fully communicate through the network).

The wireline network 18 may correspond with a cable line, coaxial line, hybrid-fiber line, optical fiber, digital subscriber line, or other line operable to support contained signaling through a physical connection with the mobile device, i.e., through a connected Ethernet cable, USB cable, etc. A private wireless network connected to a private wireline network may be treated as a private wireline network. The wireline network 18 may be a relatively fixed network where the connected to device is typically not changed on a daily basis. The wireline network may be referred to as a backhaul network in that it may be configured to support wide bandwidth signaling capabilities, and in some cases, this broad signaling capability may be used to support backhaul signal deliver for the cellular and/or wireless networks 14, 16 (e.g., signaling once received by the corresponding antenna may be carried thereafter over a backhaul associated with the wireline network). Like the wireless network 16, the wireline network 18 may include private and public type networks where signaling capabilities are associated with a level of trust established between the network and the mobile device.

One non-limiting aspect of the present invention contemplates operating according to one of a mobility mode and a portability mode. The mobility mode corresponds with optimizing network access while operating conditions of the mobile device 12 indicate a probability that the mobile device 12 will likely be moving at a relative quick rate such that frequent network switching may be required to maintain desired levels of service. The portability mode corresponds with optimizing network access when the probability of moving between networks 14, 16, 18 is slower than the mobility mode such that more time is available to facilitate executing of events necessary to facilitate accessing the next network.

The ability to facilitate operating in the mobility and portability modes allows the present invention to control the mobile device 12 in anticipation of network handoffs so that the handoffs can occur in manner that limits the chances of a service disruption. The optimization may include prioritizing handoff to the next network prior to the actual network switching event taking place so that the time taken to connect to the next network, either due to its type of network or other characteristics of the network and/or mobile device, can be ameliorated. This may be helpful in preventing signaling from being temporarily disrupted while the handoff is being negotiation, and thereby, the corresponding disruption in service.

Figure 2B:
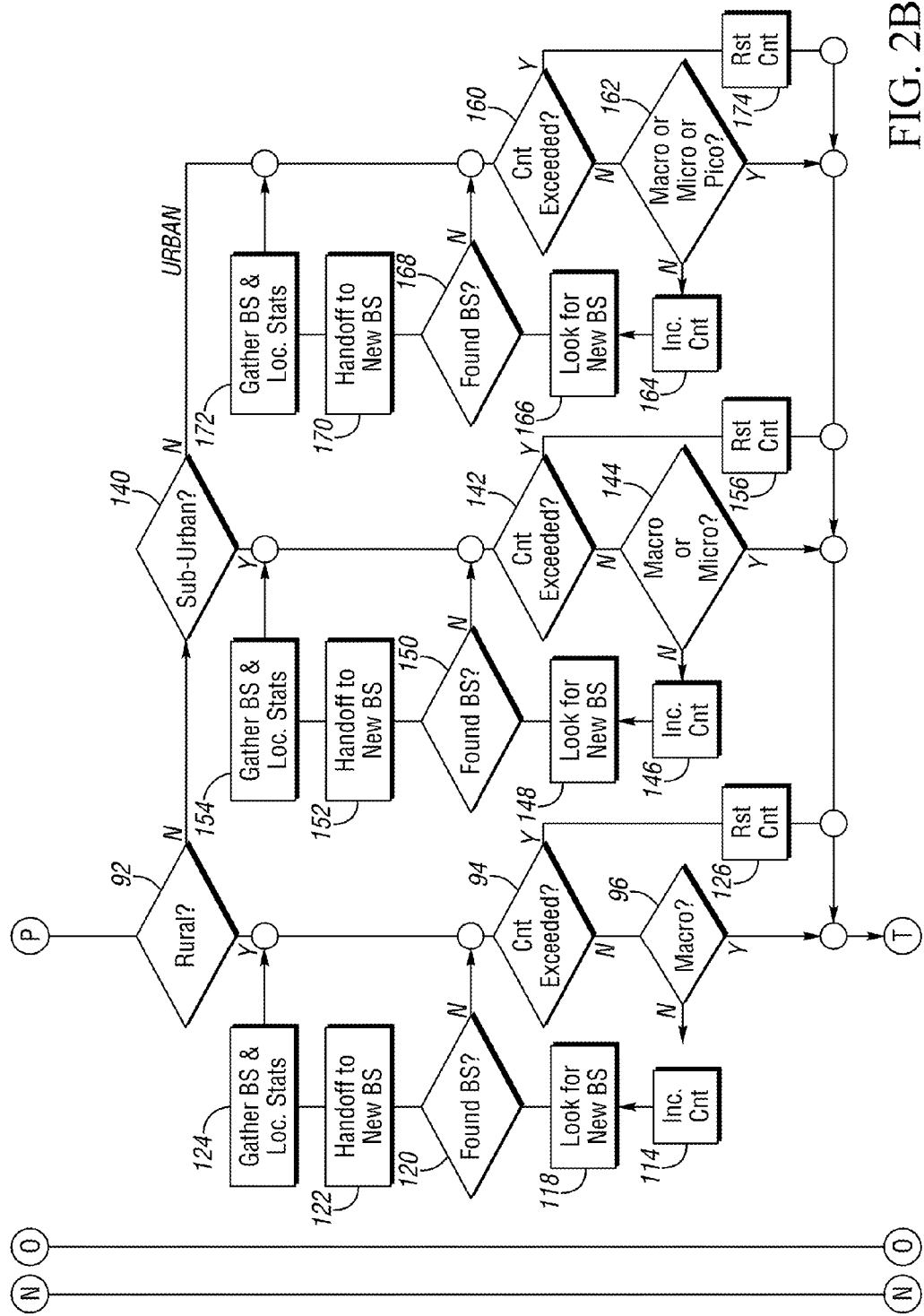
Figure 2C:
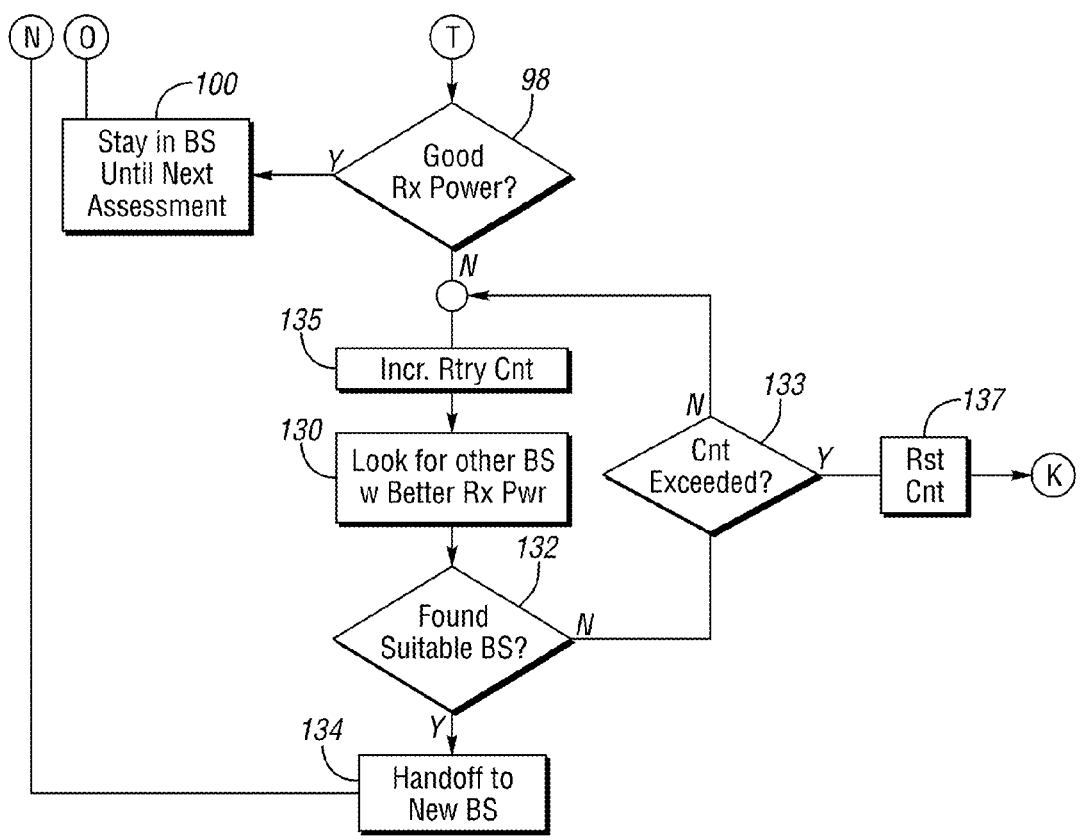
Figure 2D:
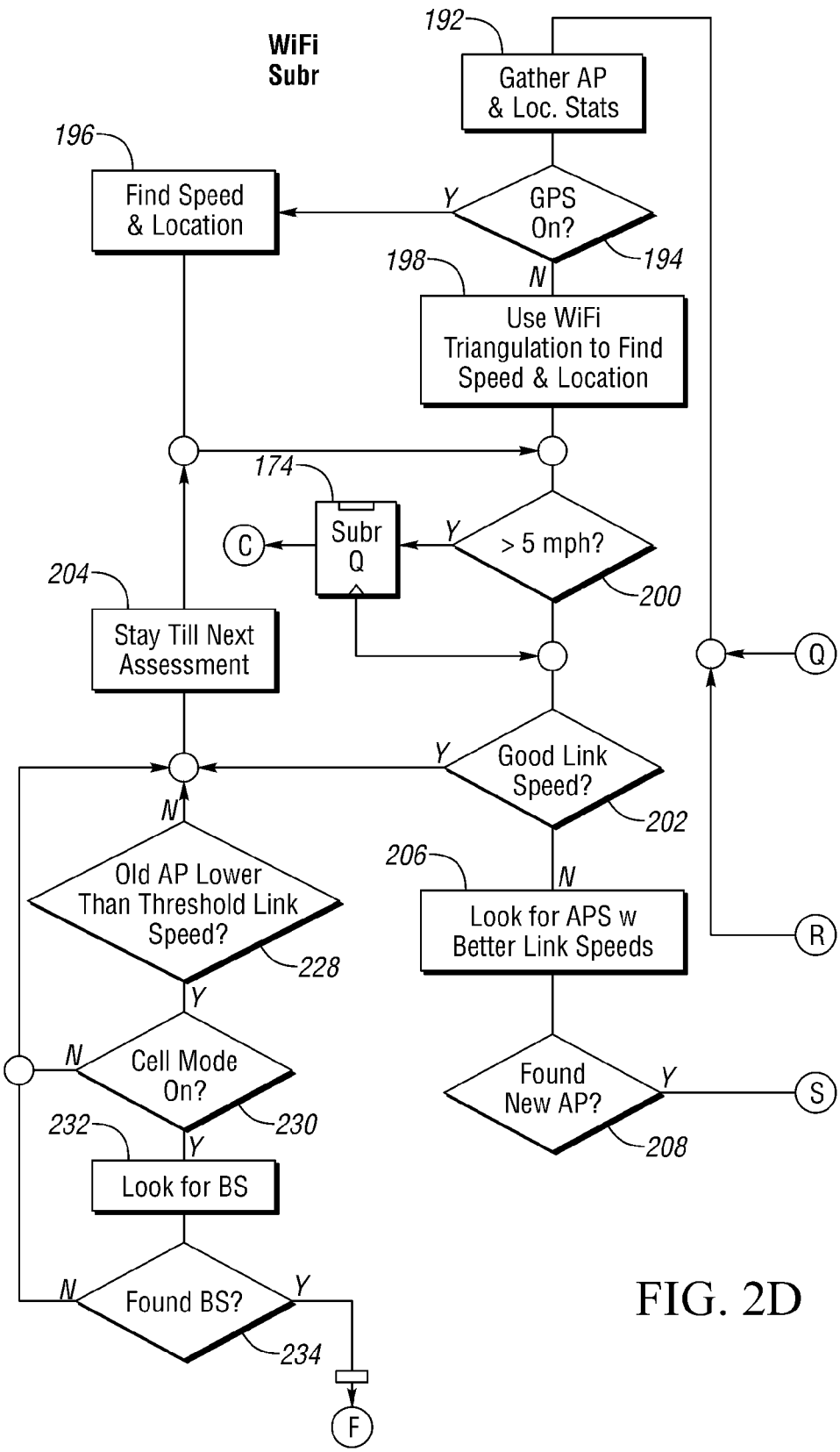
Figure 2E:
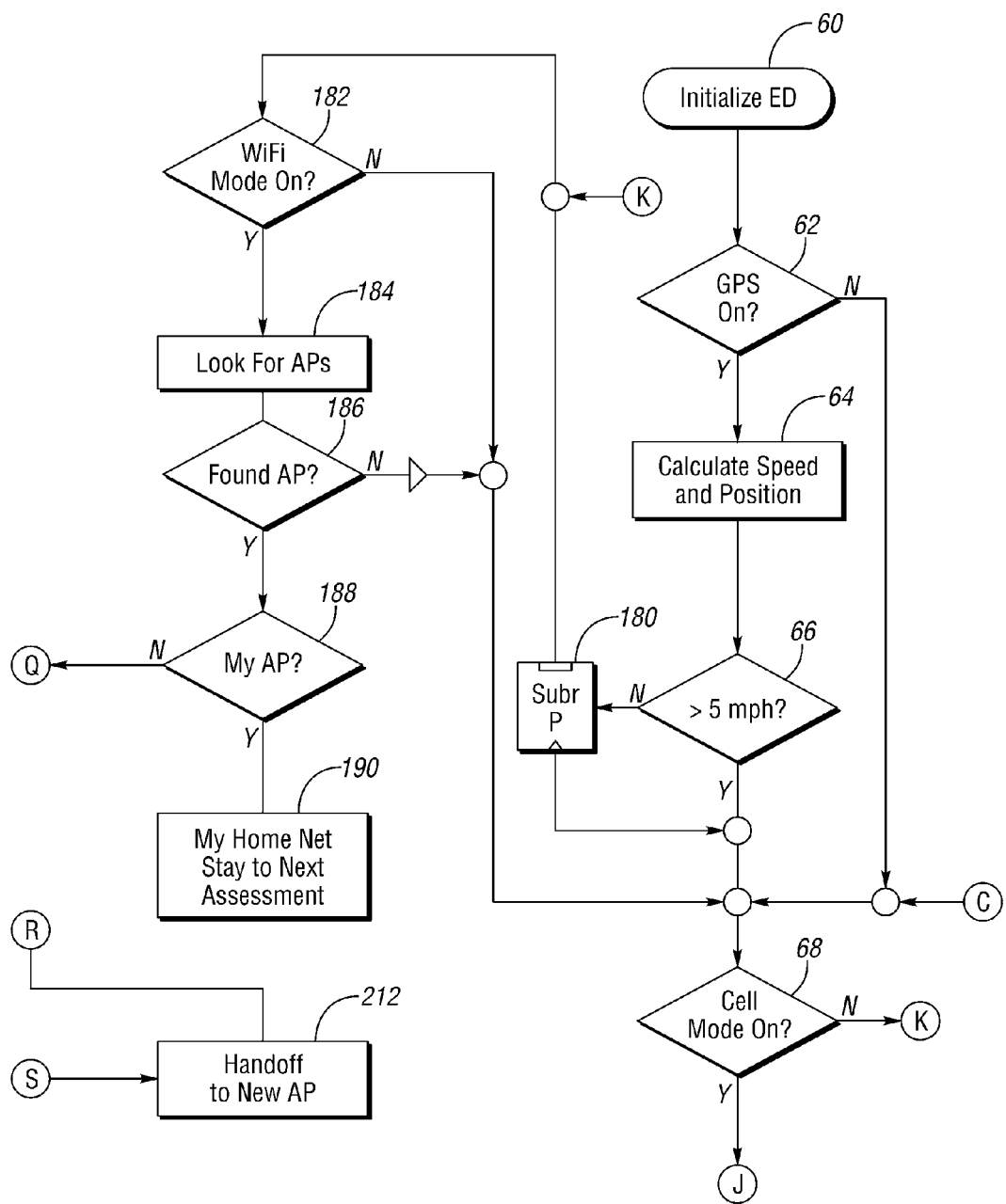
Figure 2G:
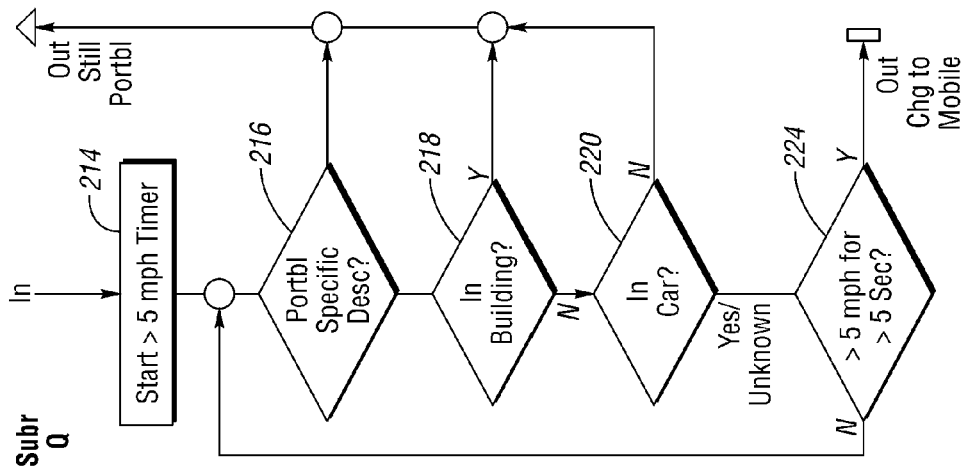
Figure 2F:
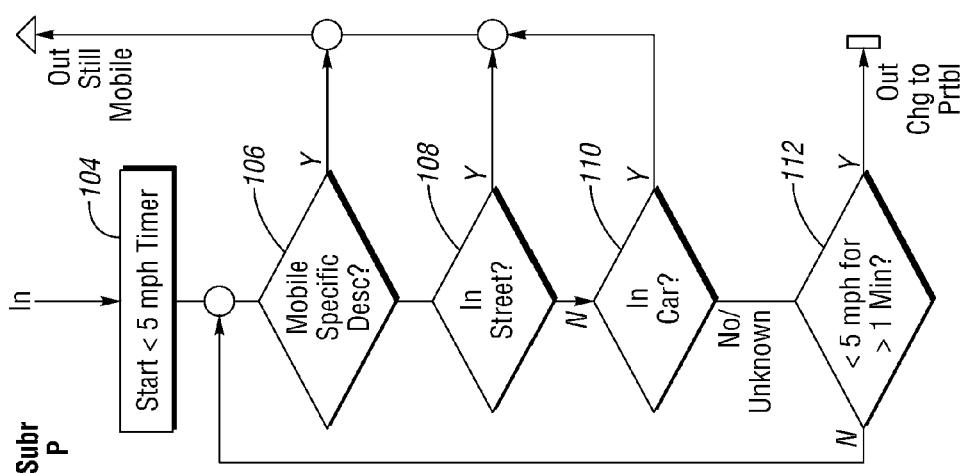
Figure 2H:
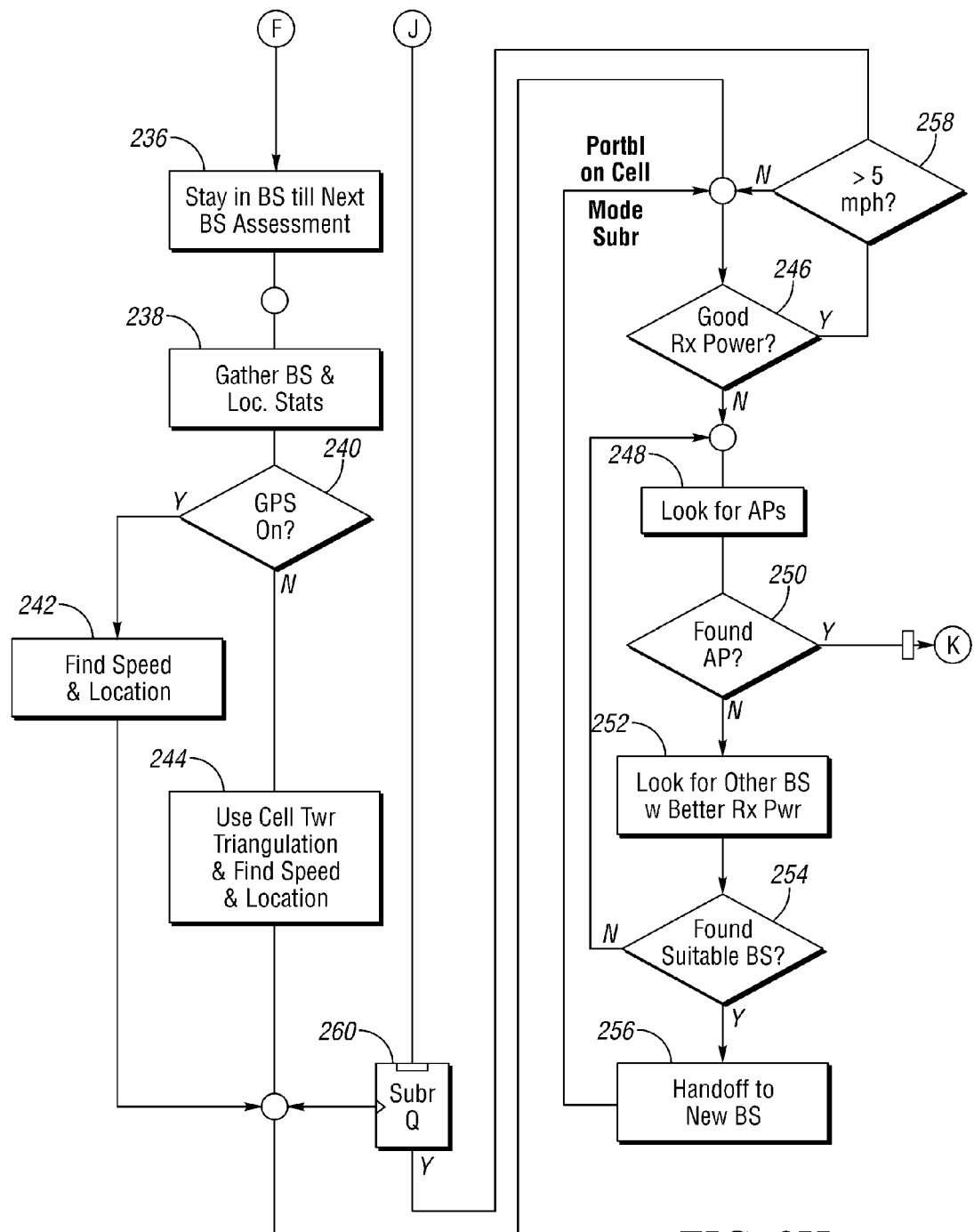

FIGS. 2a-2h illustrate portions of a flowchart for a method of optimizing access to networks in accordance with one non-limiting aspect of the present invention. The method contemplates optimizing access of the mobile device 12 to one or more of the cellular, wireless, and wireline networks 14, 16, 18 described above in order to facilitate signaling required to support any desired service, such as but not limited to facilitating signaling associated with internet access, telephony access (e.g., cellular, VoIP, etc.) media/television streaming (e.g., cable, broadcast, satellite, internet), data download, gaming, video conferencing, distance learning, home automation, VPN and the like. The method describes the mobile device as being movable between networks, however, the mobile device need not be mobile or mobile phone, laptop/tablet computer, other device having a relatively high amount of mobility as the present invention fully contemplates its use with less mobile devices, such as but not limited to a STB, PVR, media player, television, router, gateway, modem, etc.

Block 60 relates to initializing the mobile device, also referred to as an end device (ED), to support the optimization contemplated by the present invention. This may require downloading of the optimization application to the mobile device or otherwise configuring the mobile device to facilitate executing the operations contemplated by the present invention. The optimization application may be embodied in different forms and according to different operating capabilities and/or operating systems utilized by the mobile device intended for optimization. While the optimization is predominately described with respect to the noted operations being executed on the mobile device, the present invention fully contemplates an alternative entity, such as a service provider or other entity tasked with supporting the networks, being operable to direct the mobile device in the contemplated manner such that this entity may include the optimization application or an application that cooperates with the optimization application. This type of directed control may be beneficial in ameliorating the processing demands on the mobile device and/or optimizing access in a transparent and ubiquitous manner across multiple types of mobile devices, such as with an open source code system.

Block 62 relates to determining whether the mobile device includes an enabled GPS interface. The GPS interface, or similar device, may be configured to assess a geographical location of the mobile device. The GPS interface may be selectively controlled, such as by the user or the optimization application, to be in one of an enabled and disabled state. The disabled state may correspond with the GPS interface being shut-off or otherwise unable to facilitate GPS communication and the enabled state may correspond the GPS interface being normally active and capable of GPS communications.

Block 64 relates to calculating a traveling speed and determining the location of the mobile device in the event the GPS interface is enabled. The traveling speed may be calculated with the GPS interface, or an application associated therewith, such as by comparing relative positions of the mobile device at certain intervals. The traveling speed may be calculated at a relatively granular level such that the speed may be measured in miles per hour (mph) and with enough precision to accurately measure movement of a person at rest, while walking/running, and while traveling within vehicle at a much greater rate of speed.

Block 66 relates to assessing whether the traveling speed is greater than a speed threshold, which for exemplary purposes is shown to be 5 mph. The speed threshold is intended to correspond with a value representative of whether the mobile device is currently mobile or otherwise likely to traveling between networks and/or types of networks (e.g., macro cell, micro cell, pico cell, private/public wireless networks, and private/public wireline networks). The threshold of 5 mph was selected to correspond with a slightly faster than average walking speed of a person under the assumption that the mobile device is of the type that typically travels on a person that would likely only exceed normal walking speed when desiring to move to another network, as opposed to moving around a single network at normal walking speeds. The speed threshold may be adapted based on historical usage associated with the mobile device traditionally becoming mobile.

Block 68 relates to assessing whether a cellular mode is enabled. The cellular mode may correspond with the cellular interface being operational to support access to a cellular network. The cellular mode state may be one of an enabled and a disabled state and set by user input to the mobile phone, signals received from a cellular service provider, and/or the optimization application. An enabled cellular mode may be determinative of whether the mobile device is able to enter the mobility mode contemplated by the optimization of the present invention. The contemplated mobility mode corresponds with controlling the mobile device to prioritize access to the cellular network over access to the wireless or wireline networks. In the event the mobile device is traveling faster than 5 mph and the cellular mode is enabled, the mobile device may be controlled through the mobility mode.

Block 72 signifies the mobile device beginning to operate according to the mobility mode. Block 72 also corresponds with increasing an increment retry counter value. The increment retry counter value identifies a number of attempts being made to connect to a cellular network. As described in more detail below, this value may be used trigger additional operations in the event the count exceeds a desired threshold.

Block 74 relates to instructing the mobile device to look for a cellular network, or more specifically, a base station (BS) associated with a cellular network. The BS may correspond with a cellular tower or other antenna used by a cellular network to support coverage of a particular geographical area (cell). The mobile device may be configured to look for the BS while maintaining its connection to a current cellular, wireless, or wireline network. The ability to maintain a current connection while searching for other connection opportunities may be helpful in allowing the mobile device to identify and prioritize available networks for subsequent access.

Block 76 relates to determining whether a BS has been detected. Since the BS is a cellular communication medium, the detection thereof may be made using the cellular interface. The cellular interface may be configured to detect the BS identification messages. The BS detection and selection process may be facilitated by information obtained from a database stored in the mobile device. This database may have information including but not limited to priority, blacklist and other BS information. Optionally, the optimization application may be configured to direct the cellular interface when to poll for available BSs in order to limit energy consumption and/or to facilitate other operations contemplated by the present invention, e.g., optimizing energy consumption/processing demands by disabling cellular activity when not in use.

Block 78 relates to the mobile device being handed-off to the new BS. The handoff may be relatively seamless in the event the mobile device is being handed-off from an affiliated network and/or it may require the mobile device to authenticate itself or to perform other access granting operations prior to the handoff being completed. Optionally, the mobile device may be required to cooperate with the handoff operations prior to an actual need to complete the handoff in order to insure continued access to the service, i.e., prior to discontinuing signaling with the network with which the mobile device is currently connected.

Block 80 relates to the mobile device collecting characteristics and other information about the BS connected in Block 78. This information may identify the type of BS (e.g., macro, micro, pico, or femto cell), its position (e.g., GPS coordinates, longitude, and latitude), messaging requirements, costs to carry data, etc. The collected information may be subsequently used to facilitate prioritizing the connected network of the BS relative to other available networks. This information may be collected through separate means other than communicating with the base station directly.

Block 82 relates to determining whether the GPS interface is enabled, similar to the process executed in Block 62. As there are multiple paths in the flowchart by which the mobile device may enter this portion of the mobility mode, it may be necessary to assess whether the GPS interface is available. Of course, this process, along with any other redundant process, may be skipped in the event a sufficient determination has already been made.

Block 84 relates to determining a traveling speed of the mobile device, similar to the process executed in Block 64, and its current geographical location. As there are multiple paths in the flowchart by which the mobile device may enter this portion of the mobility mode, it may be necessary to assess the traveling speed again. Of course, this process, along with any other redundant process, may be skipped in the event a sufficient determination has already been made.

Block 86 relates to determining the traveling speed without reliance on information from the GPS interface in the event GPS is disabled. The traveling speed and location may be determined from the information collected above for the base station, through triangulating the BS relative to other BSs in the area, other wireless/wireline networks, and/or beacons or other available geographical identifiers. This information may also be used to identify a type of geographical location for the mobile device, as described below in more detail.

Block 88 relates to identifying whether the current traveling speed of the mobile device is greater than the selected speed threshold of 5 mph, i.e., to determine whether the traveling speed still confirms a need to connect the mobile device to a cellular network.

Block 92 relates to identifying whether the type of geographical area of the mobile device is of a 'rural' type. The 'rural' designation is intended to characterize the current location of the mobile device corresponding with a cellular service area typically associated with a macro cell. As one skilled in the art will appreciate, 'rural' or less populated areas tend to be serviced with macro cells due to the larger range of the macro cells relative to the other cells. The ability of the present invention to assess the geographical location of the mobile device relative to the cellular structure associated therewith allows the present invention to be better prioritize access in a manner that is believed to result in less service interruptions.

Block 94 relates to determining whether a count has been exceeded. The relevance of this count is explained in more detail below and generally corresponds with a counter used to track how long the mobile device continues to look for a macro cell.

Block 96 relates to determining whether the mobile device is connected to a macro cell. The mobile device may determine whether it is connected to a macro cell based on signaling power levels, information collected for the BS, and/or according to identifications included in signaling exchanged with the BS.

Block 98 relates to the BS being connected to the desired macro cell and assessing whether signaling power levels are above a desired threshold. As the mobile device starts to approach a signaling range limited of the BS, the signaling power level will begin to decrease until it eventually fades to a level insufficient to support desired communications, i.e., to a level that does or will likely to disrupt service. Block 98 relates to making an assessment of the signaling power level prior to the signaling power level causing a service disruption. Optionally, a signaling power level threshold considered as part of this assessment may be adjusted according to the traveling speed of the mobile device in order to provide a sufficient amount of time for the mobile device to search for a new BS.

Block 100 relates to the signaling power level being greater than the threshold. This means that even while the mobile device is traveling faster than 5 mph it is still traveling within a sufficient range of the BS to maintain priority of the BS over other available networks. Block 88 is then returned to continue the mobility mode assessment, and particularly, to continue assessing whether the current BS matches with a desired BS for the current geographical area of the mobile device.

Block 102 relates to entering a cellular verification mode due to the mobile device traveling speed dropping below the desired speed threshold. In the event the traveling speed of the mobile device slows, the optimization process re-prioritizes network access in favor of wireless and/or wireline networks by switching from the mobility mode to the portability mode. This may be done under the assumption that it is more cost effective to support communication using wireless/wireline networks over cellular networks, and due to the slowed traveling speed, that handovers between wireless/wireline networks may be slow enough to occur without disrupting service. The flowchart predominately identifies wireless networks, however, it is to be understood that the related operations may be similar substituted for use with wireline networks having capabilities sufficient to facilitate the contemplated network handovers.

Block 104 relates to a beginning of the cellular verification mode where a timer is started to begin further assessment of whether the mobile device traveling speed remains below the speed threshold for a period of time sufficient to indicate an actual change in traveling speed, as opposed to a temporary disruption caused from stopping at a red light, waiting in line, etc.

Blocks 106, 108, and 110 relate to performing additional verification inquiries while awaiting the timer started in Block 104 to finish. This may include gathering information that may be used to determine whether the mobile device is likely to be regained its traveling speed, i.e., conditions reflective of a need to maintain the mobility mode, or where the mobile device is likely not to regain its traveling speed, i.e., conditions reflective of a need to change to the portability mode.

Block 106 checks whether a mobile specific description can be determined from one or more operating settings/characteristics of the mobile device. This may include checking whether the mobile device is connected to a charger, which would indicate portability mode, whether the mobile device is operating in a hands-free mode, which would indicate mobility mode, and whether your Bluetooth ID indicates your inside a vehicle.

Block 108 relates to assessing whether the mobile device is in a street. The positioning of the mobile device within the street, assuming the mobile device is not typically kept in a street when immobile, may indicate a temporary stop due to traffic and a corresponding need to maintain portability mode.

Block 110 relates to assessing whether the mobile device is in a car. The positioning of the mobile device within the car, assuming the mobile device is not typically kept in a car when immobile, may indicate a temporary stop due to traffic and a corresponding need to maintain portability mode.

Block 112 relates to the intermediary inquires concluding a need to transition to the portability mode and a final assessment of whether the time set in Block 104 has expired. A threshold of the timer is shown to be 1 minute, however, this value may be adjusted according to the typically operating conditions of the mobile device. Optionally, rather than returning to Block 92 in the event the traveling speed fails to remain below the speed threshold for more than one minute, an affirmative answer to one of the inquiries conducted in Blocks 106, 108, and 110 before granting a return to portability mode. This two-factor authentication may be helpful in preventing repeated toggling between the mobility and portability modes.

Assuming a return to portability mode is not warranted, an assessment of whether the mobile device is in a 'rural' area is made in Block 92. In the event the answer is 'yes', the operations previously described with respect to Blocks 94 and 96 are repeated. The description provided above determined the current BS to be a macro cell, as such and unless the connected BS has changed, that determination would still hold.

Block 114 relates to incrementing the counter assessed in Block 94 in the event Block 96 determined the mobile device is not connected to a macro cell. This is more likely to occur prior to entering the cellular verification mode, however, for the sake of describing various aspect of the present invention, the alternative is now assumed.

Block 118 relates to the mobile device beginning to look for another available BS. While the mobile device may already be connected to a BS, that BS is not servicing a macro cell. Given the current, 'rural' geographical area, it may be more beneficial for the mobile device to connect to a macro cell rather than a micro or pico cell, as the connection to the micro or pico cell is likely to be relative short consider their smaller service areas. The macro prioritization may be beneficial in preventing the mobile device from continuous switching between smaller service areas when in a 'rural' setting that is likely to be sufficiently supported with a macro cell.

Blocks 120, 122, and 124 relate to the mobile device connecting to a new BS and collecting information from the BS in a manner similar to that described above with respect to Blocks 76, 78 and 80. Optionally, the inquiry of this 'new' network may be assessed prior to the mobile device actually connecting to it. Thereafter, the newly connected network may be assessed to determine whether it is the desired macro cell. If no new network is found or it is otherwise decided not to handover to another network, Block 94 is immediately returned to and the counter is verified whether its maximum value has been exceeded.

Block 126 relates to resetting the counter in the event the number of counts has exceeded the threshold. The threshold may be set to indicate a desire to stop searching for the desired macro cell. This may be done to prevent a continuous loop of operation should the mobile device be in a 'rural' area which is for some reason not supported by a macro cell, e.g., due to a power loss, construction, maintenance, network design, etc.

Block 98 is then reached and an assessment of the signaling power level is made to determine whether the mobile device is likely to be exiting the range of the connected BS. In the event the signaling power level is sufficient, the processes noted above may be repeated with the intention of matching the geographical location with the optimum cell size(s), e.g., trying to locate a suitable macro cell.

Block 130 is reached in the event the signaling power level is below the desired signaling power level thresholds, i.e., that the mobile device is approaching the limit of the coverage area of the BS. Block 130 relates to the mobile device searching for a new BS with a greater signal power level than the currently connected BS.

Block 132 relates to assessing whether any detected cellular networks are more suitable than the current cellular network. This may correspond with assessing whether the available networks have a high signal strength, or in event the signal strength is not better, the network is likely to be available to the moving mobile device for a longer period of time (e.g., if the mobile device is connected to a pico cell, a micro cell may be a more suitable network even though it may currently have a lower signal power level as it is more likely to service a broader area, and thereby, ameliorate potential network switching demands on the mobile device).

In the event a more suitable network was not found, the mobile device keeps searching until Blocks 133, 135 determine a maximum number of searches have occurred, whereby the count is reset in Block 137. If the during this searching period the mobile device travels beyond the range of all cellular networks, then service may be lost and/or the mobile device may then attempt to connect to a wireless or wireline network (not shown).

Block 134 is reached when a more suitable cellular network is found. Block 134 relates to the mobile device connecting to the more suitable network. Thereafter, the mobility mode continues and the processes noted above are repeated as applicable.

In the event the mobile device has changed locations or was never determined to be in a 'rural' area, the mobility mode next assesses whether the mobile device is in a 'sub-urban' area in Block 140. The 'sub-urban' designation is intended to characterize the location of the mobile device corresponding with a cellular service area typically associated with a micro or a macro cell. As one skilled in the art will appreciate, 'sub-urban' areas tend to be serviced with micro cells when there are too many users to be sufficiently supported with a macro cell. However for low usage and large coverage area scenarios, 'sub-urban' areas may also be serviced by macro cells.

If the mobile device is not determined to be in the 'sub-urban' area, the mobile device is then assumed to be in an 'urban' area. The 'urban' designation is intended to characterize the location of the mobile device corresponding with a cellular service area typically associated with a pico cell. As one skilled in the art will appreciate, 'urban' areas tend to be serviced with pico or femto cells due to an extreme number of closely packed users requiring servicing that would overwhelm micro and macro cells. However, for mobile devices that are in mobility mode only macro, micro and pico cells are considered suitable in an urban area.

Depending on whether the mobile device is determined to be in the 'sub-urban' or 'urban' locations, corresponding assessments are made in a manner similar to that described in Blocks 92, 94, 96, 114, 118, 120, 122, 124, and 126 in an effort to prioritize the mobile device to locate a corresponding desired 'macro', 'micro' or 'pico' cell.

Blocks 142, 144, 146, 148, 150, 152, 154 and 156 may corresponding with a 'sub-urban' determination being made in a similar manner to those made with respect to the 'rural' determination. Optionally, Block 144 may accept a micro or a macro cell, instead of just a micro cell, in order to prioritize a broader range of suitable cellular networks.

Blocks 160, 162, 164, 166, 168, 170, 172, and 174 may corresponding with an 'urban' determination be made in a similar manner to those made with respect to the 'rural' determination. Like Block 144, Block 162 may optionally accept a macro, micro, or pico cell, instead of just a pico cell, in order to prioritize a broader range of suitable cellular networks.

The mobility mode, as supported above, generally corresponds with the mobile device attempting to access a certain type of cellular network where the network type corresponds with the BS supporting the signaling thereof, e.g., macro, micro, or pico cells. The mobility mode, however, still allows the mobile device to connect to a less desirable type of cellular network in the event the desired type of network is not found (e.g., a micro cell network when in a rural area). This may be required in order to insure the mobile device is able to continue uninterrupted service when the desired type of network is unavailable, or at the least, service minimally interrupted by multiple handoffs.

The mobility mode prioritizes cellular networks over wireless/wireline networks due to the traveling speed of the mobile device requiring quicker transitions between networks than that which has been traditionally available when transitioning between wireless and/or wireline networks. The present invention, however, recognizes that some services may be tolerant to slow transitions and/or there may be some other reason, such as cost savings or the traveling speed of the mobile device simply dropping below the speed threshold, to favor use of wireless and/or wireline networks over cellular networks. The present invention contemplates prioritizing wireless public networks with implementation of the portability mode.

The portability mode may be engaged in response to a plurality of circumstance, such as in response to Block 112 verifying the traveling speed to have dropped below the speed threshold for a sufficient period of time or Block 66 determining the mobile device to never have surpassed the speed threshold after a recent initialization of the mobile device. For the sake of providing an exemplary scenario, the following description assumes Block 66 determined the traveling speed to be less than the speed threshold.

Since Block 66 may itself be reached through other process besides the initialization of Block 62, Block 180 is reached and the cellular verification mode process described in Blocks 104, 106, 108, 110, and 112 is repeated to confirm the mobile device has not temporarily dropped below the speed threshold. Assuming the mobile device has not temporarily dropped below the speed threshold, Block 182 is reached.

Block 182 relates to assessing whether a wireless mode is enabled. The wireless mode may correspond with the wireless interface being operational to support access to a wireless network. The wireless mode state may be one of an enabled and a disabled state and set by user input to the mobile phone, signals received from a wireless service provider, and/or the optimization application. An enabled wireless mode may be determinative of whether the mobile device is able to enter the portability mode contemplated by the optimization of the present invention. The contemplated portability mode corresponds with controlling the mobile device to prioritize access to wireless networks over access to cellular networks.

Block 184 relates to instructing the mobile device to look for a wireless network, or more specifically, an access point (AP) associated with a wireless network. The AP may correspond with a router, a tower or other antenna used by a wireless network to support coverage of a particular geographical area. The mobile device may be configured to look for the AP while maintaining its connection to a current cellular, wireless, or wireline network. The ability to maintain a current connection while searching for other, new connection opportunities is helpful in allowing the mobile device to identify and prioritize available networks for subsequent access.

Block 186 to determining whether an AP has been detected. Since the AP is a wireless communication medium, the detection thereof may be made using the wireless interface. The wireless interface may be configured to detect signals that identify the AP. The AP detection and selection process may be facilitated by information obtained from a database stored in the mobile device. This database may have information including but not limited to priority, blacklist and other AP information. Optionally, the optimization application may be configured to direct the wireless interface when to poll for available APs in order to limit energy consumption and/or to facilitate other operations contemplated by the present invention, e.g., optimizing energy consumption/processing demands by disabling wireless activity when not in use.

Block 188 relates to the mobile device determining whether the found AP is associated with a private or public type of wireless network. The 'my' AP determination may relate to the mobile device determining whether the available wireless network has been previously associated with the mobile device or otherwise one which the mobile device has approved, i.e., it has an established level of trust.

Optionally, the mobility mode may include a preference for connecting to approved wireless networks or a 'home' wireless network over other networks as it may allow the mobile device to access data specific to that network or otherwise unavailable through other networks and/or the 'home' network may include security and other features favored by the mobile device. Any number of reasons may dictate prioritizing connecting to a certain type of wireless network over another, even if the another network may have better performance characteristics, such as greater signal power levels.

Block 190 relates to determining the AP to be associated with the 'home' network of the mobile device and facilitating connection thereto. Unless the mobile device becomes mobile or the initialization is re-started in Block 60 (e.g., the optimization application may re-initialized automatically after a certain period of time or if signaling is lost), the mobile device may remain connected to the 'home' network and further processing may cease. Optionally, the cellular interface and/or the GPS interface may be disabled at this point in order to limit further energy consumption by those interfaces.

Block 192 relates to the mobile device collecting characteristics and other information about the connected AP. This information may identify the type of AP (e.g., public, private (but not 'home'), etc.), its position (e.g., GPS coordinates, longitude, and latitude), messaging requirements, costs to carry data, etc. The collected information may be subsequently used to facilitate prioritizing the connected network relative to other available networks.

Block 194 relates to determining whether the GPS interface is enabled, similar to the process executed in Block 62. As there are multiple paths in the flowchart by which the mobile device may enter this portion of the mobility mode, it may be necessary to assess whether the GPS interface is available. Of course, this process, along with any other redundant process, may be skipped in the event a sufficient determination has already been made.

Block 196 relates to determining a traveling speed of the mobile device, similar to the process executed in Block 64, and its current geographical location. As there are multiple paths in the flowchart by which the mobile device may enter this portion of the mobility mode, it may be necessary to assess the traveling speed again. Of course, this process, along with any other redundant process, may be skipped in the event a sufficient determination has already been made.

Block 198 relates to determining the traveling speed without reliance on information from the GPS interface. This may be done based on the information collected above for the base station, through triangulating the AP relative to other APs in the area, other cellular networks, and/or beacons or other available geographical identifiers. This information may also be used to identify a current position of the mobile device for subsequent use as described below in more detail.

Block 200 relates to identifying whether the current traveling speed of the mobile device is greater than the selected speed threshold of 5 mph, i.e., to determine whether the traveling speed still confirms a need to connect the mobile device to a wireless network.

Block 202 relates to assessing a link speed at which the mobile device is communication over the wireless network. The link speed may be measured as megabytes per second (MBps) or according to some other metric. A good link speed may be one above a link speed threshold required to support the desired operations of the mobile device. The link speed threshold may be adjusted dynamically according to the services begin accessed through the mobile device (e.g., video streaming may require a greater desirable link speed than data download) and/or according to user input.

Block 204 relates to the link speed being acceptable and continuing to check for a change in traveling of the mobile device or a decrease in link speed sufficient to warrant transferring to another wireless network, or in the event a suitable wireless network is not available, to a cellular network.

Block 206 relates to the link speed being insufficient and the mobility mode determining to re-prioritize the wireless networks available for connection. This may be done with the mobile device simultaneously supporting communications with the currently connected AP while searching for other nearby APs.

Block 212 relates to executing a handoff to the new AP, and thereafter, repeating the assessments of Blocks 192, 194, 196, 198, 200, 202, 204, and 206 in an effort to continually prioritize the networks desired for connection. Optionally, an assessment of the link speed of the new network may be evaluated prior to executing the handoff, such as to avoid switching to a network having an even lower link speed. The unconfirmed switching, however, may be beneficial in preventing an interruption in service if it can be assumed the lower than desired link speed indicates the mobile device is likely to experience an interruption in service anyway.

If during the continued assessment or upon first entry to the portability mode, Block 200 determines the mobile device be moving at a traveling speed greater than the traveling speed threshold, Block 214 is reached and a portability verification mode is entered. The portability verification mode corresponds with assessing whether the change in traveling speed is sufficient to justify switching to the mobility mode or whether it has resulted from a temporary change of condition.

Block 214 relates to a beginning of the wireless verification mode where a timer is started to begin further assessment of whether the mobile device traveling speed remains above the speed threshold for a period of time sufficient to indicate an actual change in traveling speed, as opposed to a temporary speed change from walking around an office or moving to an different area within a home.

Blocks 216, 218, and 220 relate to performing additional verification inquiries while awaiting the timer started in Block 214 to finish. This may include conducting multiple assessments to gather information that may be used to determine whether the mobile device is likely to be return to a low traveling speed, i.e., conditions reflective of a need to maintain the portability mode, or where the mobile device is likely maintain its traveling speed, i.e., conditions reflective of a need to change to the mobility mode.

Block 216 checks whether a portability specific description can be determined from one or more operating settings/characteristics of the mobile device. This may include checking whether the mobile device is connected to a charger or the mobile device is connected to devices associated with a fix location such as a gaming system or stereo system which would indicate portability mode, whether the mobile device is operating in a hands-free mode, which would indicate mobility mode.

Block 218 relates to assessing whether the mobile device is in a building. The positioning of the mobile device within the building, assuming the mobile device is typically kept in a building when immobile, may indicate a temporary speed increase and a corresponding need to maintain portability mode.

Block 220 relates to assessing whether the mobile device is in a car. The positioning of the mobile device within the car, assuming the mobile device is typically kept in a car when mobile, may indicate the increased traveling speed will continue.

Block 224 relates to assessing whether the traveling speed has been greater than the speed threshold for a predefined period of time. The time threshold is shown to be 5 seconds; however, this value may be adjusted according to the typically operating conditions of the mobile device. Optionally, rather than returning to Block 202 in the event the traveling speed remains below the speed threshold, a corresponding answer to one of the inquiries conducted in Blocks 216, 218, and 220 may be required before granting a return to portability mode. This two-factor authentication may be helpful in preventing repeated toggling between the mobility and portability modes.

Block 202 is returned to in the event portability mode is maintained. Thereafter, the processes of Blocks 202, 204, 206, 208, and 228 are executed as appropriate to continue with assessing whether the connected wireless network is providing the link speed desired for the current operating demands of the mobile device.

Block 228 is reached if no new network with better link speed is found. Block 228 relates to assessing whether the currently connected link speed is below a minimum link speed threshold needed to support the operating demand of the mobile device. This threshold may vary over time with changes in the operating demands of the mobile device. In the event the minimum link speed has not been surpassed, the mobile device continues in Block 204 to look for a network with a better link speed than the currently connected network.

Block 230 is reached in the event the current link speed is below the minimum link speed threshold and no other network with better link speed is available. Blocks 230, 232, and 234 related to verifying whether cellular mode is available and whether a BS is found before disconnecting from the wireless network to connect to the cellular network. If so, Block 236 relates to a modified portability mode where the mobile device prioritizes connecting to a cellular network even though the mobile device is moving at a traveling speed less than the traveling speed typically used to trigger mobility mode. The modified portability mode, as described below in more detail, is less dependent on matching the type of geographical area of the mobile device to a certain type of cellular network since the mobile device is not moving at a traveling speed where frequent handoffs between cellular networks is likely to cause a service disruption.

Block 236 relates to the mobile device accessing a cellular network as quickly as possible in order to avoid the low link speed of the connected wireless network causing a service disruption. Block 236 optionally includes the mobile device connecting to a BS without fully analyzing the BS in order to speed the handoff. The mobile device may conduct a search or otherwise identify the BS prior to determining the low link speed in Block 228 and/or while being connected to the wireless network. Given the relatively immobile state of the mobile device, the BS may be identified well in advance of the link speed dropping below the minimum threshold so that that the BS can be quickly transitioned to prior to a service disruption.

Block 238 relates to the mobile device collecting characteristics and other information about the connected BS. This information may identify the type of BS (e.g., macro, micro, pico, or femto cell), its position (e.g., GPS coordinates, longitude, and latitude), messaging requirements, costs to carry data, etc. The collected information may be subsequently used to facilitate prioritizing the connected network relative to other available networks.

Blocks 240, 242, and 244 relate to determining whether traveling speed can be determined with GPS (Block 242) or cellular tower triangulation (Block 244). The traveling speed may need to be determined for use in subsequently deciding whether to exit the modified portability mode in favor of the full portability mode.

Block 246 relates to the mobile device determining whether the signaling power level of the connected cellular network is sufficient to support the operating demand of the mobile device. Optionally, the mobile device may conduct this analysis prior to entering the modified portability mode in order to ensure the first connected cellular network has a sufficient signaling power level. Of course, this may not be possible, particularly if the mobile device has slowly moved to another location or its operating demands have changed, such that the inquiry of Block 234 may need to be performed in order to update the assessment of the signaling power level.

Blocks 248 and 250 relate to the mobile device continuing to look for an AP having sufficient signaling power levels, i.e., in an attempt to return to the portability mode.

Blocks 252, 254, and 256 relates to the absence of suitable AP and the mobile device searching for a BS from which signals are received with more power, and if found, connecting to the better BS. Once connected to the desired BS, the process is repeated upon return to Block 246. The modified mobility mode optionally does not prioritize connecting the mobile device to specific type of cellular network (e.g., macro, micro, pico cell-based networks) in favor of quickly connecting the mobile device in an effort to maintain a continuity of service. Of course, if multiple cellular networks are available, the present invention fully contemplates assessing the available type of network and making a connection selection based thereon.

Block 258 relates to assessing the mobile device traveling speed in the event the signaling power level of the connected cellular network is sufficient to support the desired operations. In the event the traveling speed remains below the speed threshold, then the mobile device may remain connected to the cellular network and the process of Blocks 246, 248, 250, 252, 254, and 256 may be repeated to ensure the mobile device is connected to a cellular network having sufficient signaling power levels.

Since the modified portability mode may be agnostic of the type of cellular network being used to support service, Block 258 relates to assessing whether a need exists to switch to mobility mode, i.e., to begin matching the geographical area of a traveling mobile device to certain types of cellular networks that are a less likely to require frequent handoffs and/or network exchange induced service disruptions.

Block 260 relates to the traveling speed threshold increasing above the speed threshold and implementing the portability verification mode to verify the mobile device has actually become mobile. In the event the change of speed was not determined to be reflective of the mobile device becoming sufficiently mobile, the process returns to Block 246. The portability mode is implemented in Block 72 in the event the portability verification mode confirms a sufficient speed change.

Block 72 relates to a return to the portability mode following the confirmation associated with Block 260. Blocks 72, 74, and 76 relate to setting increment counter values to be used in limiting an amount of searching for a BS. While the mobile device is likely to still be connected to the BS associated with Block 260, rendering these Blocks moot, Block 72 can also be reached following the assessment of Block 68, i.e., before the mobile device has connected to a BS. In either event, Block 264, confirms the count has needed exceed a maximum threshold so that searching can continue, and if the threshold has been exceeded, resetting the count value in Blocks 266, 268, and 270 if the GPS is available to confirm traveling speed, and if not, bypassing the decision of block 264 so that searching can continue.

As supported above, one non-limiting aspect of the present invention relates to a network selection methodology that optimizes network access cost and performance using subscriber end device position, speed, service type and other metrics. The present invention may provide a flexible wireless strategy that adapts to the existing resources and the environment of a wireline operator. This may include: the cellular spectrum available, incumbent cellular provider friendliness in supporting MVNOs (mobile virtual network operators), wireline provider capability to implement a WiFi strategy, etc.

One non-limiting aspect of the present invention contemplates optimizing the use of the existing wireline infrastructure since the wireline infrastructure may have more capacity than the cellular-wireless infrastructure. Minimization of traffic over cellular networks diminishes the cost a wireline provider incurs renting capacity as an MVNO and it optimizes performance for the cellular carriers as more cellular capacity becomes available for the subscribers that stay in the cellular network. Subscribers in need of portability could use WiFi networks with wireline backhaul.

One non-limiting aspect of the present invention contemplates facilitating partnerships with cellular providers so that the cellular subscriber's backhaul traffic is carried over wireline networks. A peering arrangement can be promoted after the relative transport value of the wireline traffic versus cellular wireless traffic (mobility) versus WiFi wireless traffic (portability) is determined.

One non-limiting aspect of the present invention contemplates a strategy that suits wireline (cable, DSL, fiber) operators offering triple-play (data, voice, video) services. This strategy could be a combination of approaches that have the right levels of support for mobility, for portability and for fixed location services. In order to determine this customized mixed set of services, this invention disclosure describes a methodology by which this mixed of services is achieved by determining whether a customer requires mobility, or portability or fixed/single location services based on the movement, speed and other service and end station characteristics.

One non-limiting aspect of the present invention assumes that a subscriber that requires mobility would be taking advantage of transport technology that may be optimized for handoffs at higher speeds (i.e. Cellular). A customer that requires portability may require an untethered access technology (i.e. WiFi) that is ubiquitous in the locations that the subscriber frequents. Local handoffs may be assumed in a portable scenario but they are low speed handoffs. The third case of fixed or single location services may assume that the fixed location is not public but a private network served by the wireline provider in the traditional sense. In this case, the subscriber can access their own WiFi access point that connect to the internet through their wireline service One approach may be to establish a relation with an MVNO and to use their network as little as possible only for the scenarios were mobility is needed, such as according to a set of intelligent rules and relations on events and conditions to determine what type of service is needed for what customer.

One non-limiting aspect of the present invention contemplates the tools that a subscriber end device may have to determine speed and position may vary based on its capabilities and based on what tool is currently enabled.

One non-limiting aspect of the present invention contemplates changes in position, speed and other important parameters need to be examined in order to determine whether there has been a change in mobility state. The type of location for the BS or AP. Whether the location is indoor or outdoor, first floor or a higher floor, mall or airport, whether it is inside a car or not. If the end device is powered by battery, the likelihood of being a mobility scenario may be higher than if it is powered by AC.

One non-limiting aspect of the present invention contemplates relying on the variety of cell types to enhance service. In particular, as there is an overhead to the handovers that occurs between cells, to ameliorate the number of handoffs is possible. If a moving subscriber is passing through a series of smaller cells while having the opportunity to stay in a bigger cell, that subscriber end device may have the option to stay or move to a larger cell rather than hop to a smaller cell that will have short duration higher power followed by short duration lower receive power. One non-limiting aspect of the present invention contemplates a strategy that also promotes infrequent handovers in addition to a more stable performance. In this fashion in certain environments, the present invention can also dedicate the femto and pico cells to subscribers requiring portability while the ones moving at higher speeds, requiring mobility would use the macro and micro-cells. In an urban environment, the pico cells could be used for mobility customers while in a suburban environment pico cells could be targeted to the subscriber requiring portability but not mobility.

One non-limiting aspect of the present invention contemplates certain applications that would be typical for mobility scenarios while other applications would imply a portability scenario while a third group of applications could be suitable for both. Application awareness tools such as deep packet inspection systems could be used to corroborate the decision making process that determines whether certain users are either in a mobile setting or in a portability setting. This could be used in conjunction with other data.

One non-limiting aspect of the present invention contemplates collecting information has to be collected from different devices and correlating that information into an elaborate set of rules regarding what determines that a customer is in one scenario or another had stored. The use of intelligent databases can optimize the implementation engine. When optimal selection of network resources is not possible due to lack of availability or due to capabilities not available or not enabled at the subscriber's end device, alternative paths are selected.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. Likewise, the noted operation and process sequences may be combined or executed in a different manner or according to a different sequence in order to achieve the contemplated results.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for use with a wireless device to optimize access to wireless signaling available from cellular and wireless networks, the method comprising:
   identifying a traveling speed of the wireless device;
   implementing a mobility mode in the event the traveling speed is greater than a speed threshold, the mobility mode instructing the wireless device to prioritize access to cellular networks over access to wireless networks when at least one cellular network and at least one wireless network are simultaneously operable to facilitate wireless signaling with the wireless device;
   implementing a portability mode in the event the traveling speed is less than the speed threshold, the portability mode instructing the wireless device to prioritize access to wireless networks over access to cellular networks when at least one cellular network and at least one wireless network are simultaneously operable to facilitate wireless signaling with the wireless device;
   identifying a geographical location of the wireless device;
   instructing the wireless device to prioritize access to a first type of cellular network over a second type of cellular network in the event the geographical location is a first location and both of the first and second types of cellular networks are operable to facilitate wireless signaling with the wireless device; and
   instructing the wireless device to prioritize access to the second type of cellular network over a third type of cellular network in the event the geographical location is a second location and both of the second and third types of cellular networks are operable to facilitate wireless signaling with the wireless device.

2. The method of claim 1 wherein:
   the first location is a rural area and the second location is a sub-urban area, the rural area being less populated with people than the sub-urban area; and
   the first type is a macro cell, the second type is a micro cell and the third type is at least a pico cell, the macro cell having greater signaling strength than the micro cell and the micro cell having greater signaling strength than the pico cell.

3. The method of claim 2 further comprising, when implementing the mobility mode while the geographical location of the wireless device is of the first type and the wireless device is accessing one of the first type of cellular networks and the signaling power is above the desired power threshold, instructing the wireless device to continue accessing the one of the first type of cellular networks when one of the second type of cellular network having greater signaling power is available.

4. The method of claim 1 further comprising, when implementing the portability mode, instructing the wireless device to prioritize the first type of wireless network over the second type of wireless network, the first type of wireless network being a private network and the second type of wireless network being a public network, the private network requiring the wireless device to establish a level of trust prior to access greater than the a level trust needed to access the public network.

5. The method of claim 1 further comprising instructing the wireless device to implement the mobility mode in the event the traveling speed is less than the speed threshold if:
   the wireless device is positioned in a street;
   the wireless device is positioned within a vehicle; and
   the traveling speed is less than the speed threshold for less than a predefined period of time.

6. The method of claim 1 further comprising instructing the wireless device to communicate through a wireless antenna when accessing wireless networks and a separate, cellular antenna when accessing cellular networks.

7. The method of claim 1 further comprising when at least two cellular networks and at least two wireless networks are operable with the wireless device:
   implementing the mobility mode such that the wireless device at least attempts to access each operable cellular network before attempting to access any available wireless network; and
   implementing the portability mode when at least two cellular networks and at least two wireless networks are operable within the wireless device such that the wireless device at least attempts to access each operable wireless network before attempting to access any available cellular network.

8. A method for use with a mobile device to arbitrate signaling between cellular and wireless networks, the mobile device having a wireless device operable to support signaling with wireless networks and a cellular device operable to support signaling with cellular networks, the method comprising:

determining an operating state of the mobile device to be one of a mobility state and a portability state depending on a traveling speed of the mobile device;

instructing the mobile device to connect to wireless networks using the wireless device in the event the portability state is determined;

instructing the mobile device to connect to cellular networks using the cellular device in the event the mobility state is determined; and determining the operating state to be one of the mobility state and the portability state without assessing bandwidth.

9. The method of claim 8 further comprising determining the mobility state in the event the traveling speed is equal to or greater than a speed threshold and the portability state in the event the traveling speed is less than the speed threshold.

10. The method of claim 9 further comprising determining the speed threshold to be slightly above an average walking speed.

11. The method of claim 9 further comprising overriding the portability state and instead determining the operating state to be the mobility state when the traveling speed is less than the threshold if wirelessly connected to a vehicle.

12. The method of claim 9 further comprising determining the operating state to be one of the mobility state and the portability state without assessing signal strength.

13. The method of claim 10 further comprising:
determining the average walking speed based on historical usage associated with the mobile device; and
preventing the wireless device from searching for wireless networks when operating according to the mobility mode; and
preventing the wireless device from searching for cellular networks when operating according to the portability mode.

14. A computer-readable medium having stored thereon a plurality of non-transitory instructions including instructions which, when executed by a processor operating on a mobile device when at least two cellular networks and at least two wireless networks are operable with the with the mobile device, cause the processor to:

instruct the mobile device to operate according to one of a mobility mode and a portability mode depending on a traveling speed of the mobile device, including:

i) prioritizing access to cellular networks instead of available wireless networks when operating according to the mobility mode unless operable cellular networks are unavailable;

ii) prioritizing access to wireless networks instead of available cellular networks when operating according to the portability mode unless operable wireless networks are unavailable;

iii) instruct the mobile device to attempt access each of the at least two cellular networks before attempting to access any of the at least two wireless networks when operating according to the mobility mode; and iv) instruct the mobile device to attempt access each of the at least two wireless networks before attempting to access any of the at least two cellular networks when operating according to the portability mode.

15. The computer-readable medium of claim 14 having instructions which cause the processor to:

determine a geographical area of the mobile device to be at least one of a first location and a second location when operating according to the mobility mode, the first location being less populated than the second location; and prioritize access to at least a first, a second and a third type of the cellular networks based on the geographical area when each of the first, second and third type of cellular networks operate at differing signaling strengths, including i) instructing the mobile device to prioritize access to the first type of the cellular networks over the second type of cellular network in the event the geographical location is the first location; and ii) instructing the wireless device to prioritize access to the second type of cellular network over the third type of cellular network in the event the geographical location is the second location.

16. The computer-readable medium of claim 14 having instructions which cause the processor to:

instruct the wireless device to operate according to the mobility mode if:

i) the mobile device is positioned in a street while the traveling speed is less than a speed threshold and the mobile device is not typically kept in the street;

ii) the mobile device is positioned within a vehicle while the traveling speed is less than the speed threshold; and iii) the traveling speed is less than the speed threshold for less than a predefined period of time; and instruct the wireless device to operate according to the portability mode if:

i) the wireless device is wirelessly connected to a device having a fixed location while the traveling speed is greater than the speed threshold; and ii) the traveling speed fails to be greater than the speed threshold for more than a predefined period of time.

17. The computer-readable medium of claim 14 having instructions which cause the processor to:

disable a wireless device of the mobile device used to access wireless networks when operating according to the mobility mode, thereby preventing the wireless device from polling for wireless networks; and disable a cellular device of the mobile device used to access cellular networks when operating according to the portability mode, thereby preventing the cellular device from polling for cellular networks.

* * * * *